United States Patent
Banerjee et al.

(10) Patent No.: US 6,431,665 B1
(45) Date of Patent: Aug. 13, 2002

(54) TRACK ADJUSTMENT ASSEMBLY TO REDUCE VIBRATION

(75) Inventors: Bappaditya Banerjee, Peoria; Roger A. Wehage, Dunlap, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/628,712

(22) Filed: Jul. 31, 2000

Related U.S. Application Data
(60) Provisional application No. 60/150,263, filed on Aug. 23, 1999.

(51) Int. Cl.[7] .............................................. B62D 55/30
(52) U.S. Cl. ........................................ 305/144; 180/9.1
(58) Field of Search ................................. 305/143, 144, 305/145; 180/9.1

(56) References Cited

U.S. PATENT DOCUMENTS 5,390,996 A * 2/1995 Bliss ........................... 305/143
6,024,183 A * 2/2000 Dietz et al. .................. 305/144
6,062,327 A * 5/2000 Ketting et al. ............... 305/144

* cited by examiner

*Primary Examiner*—Russell D. Stormer
(74) *Attorney, Agent, or Firm*—Howard & Howard

(57) ABSTRACT

The subject invention includes a track assembly for a mobile machine such as an earth-moving machine. The track assembly includes continuous track driven about a track frame. A drive wheel, an idler wheel and a number of carrier wheels are rotatably supported by the track frame and engage the track. An adjustment device is connected to the track wheel. The adjustment device adjusts a relative position of one of the track wheels to tension the track. A controller is connected to the adjustment device to control the adjustment of one of the track wheels. A sensor is disposed adjacent the track and connected to the controller. The sensor is adapted for sensing vibrational forces, or track noise, of the track and transmitting the parameters of the forces to the controller to automatically adjust the track.

14 Claims, 4 Drawing Sheets

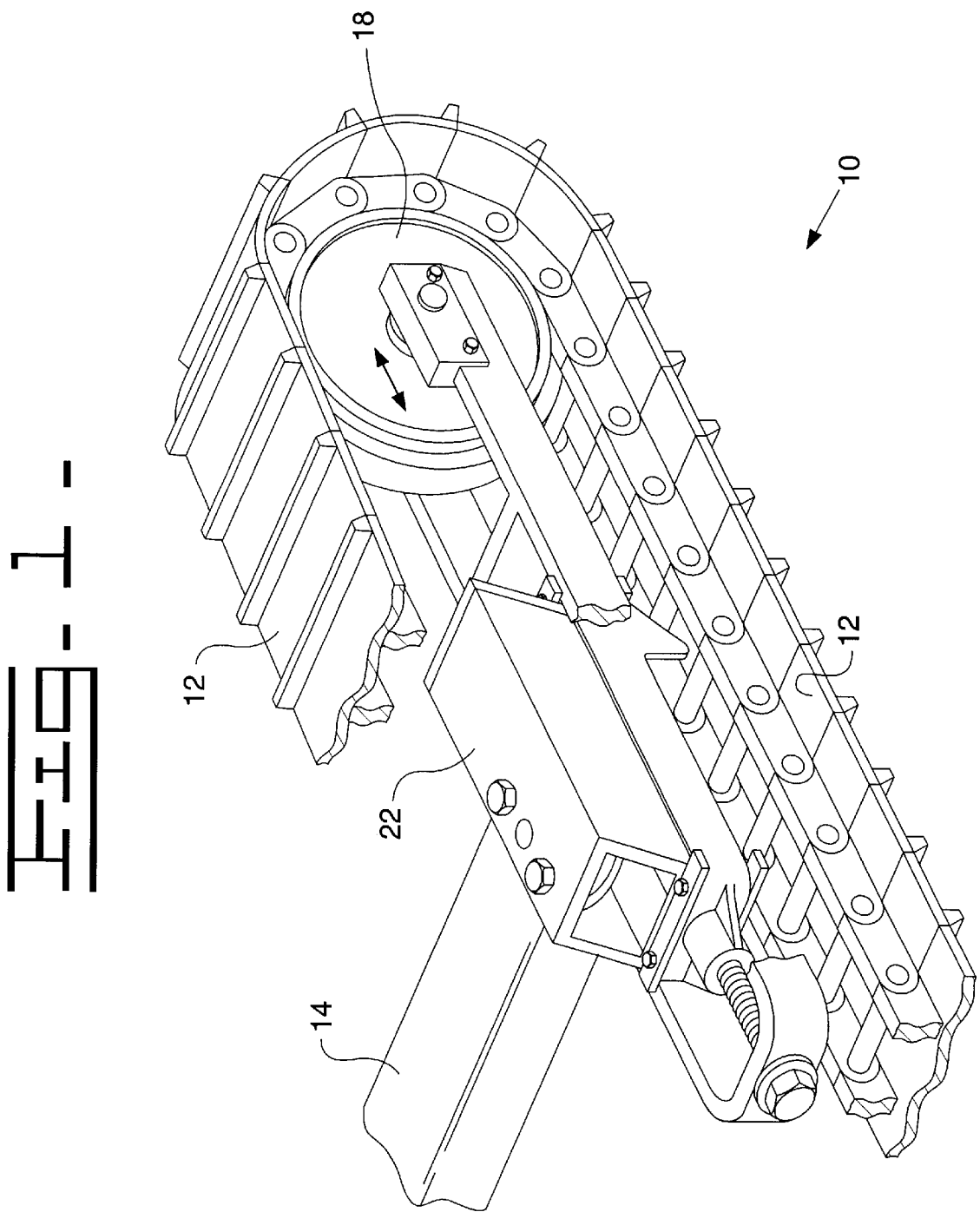

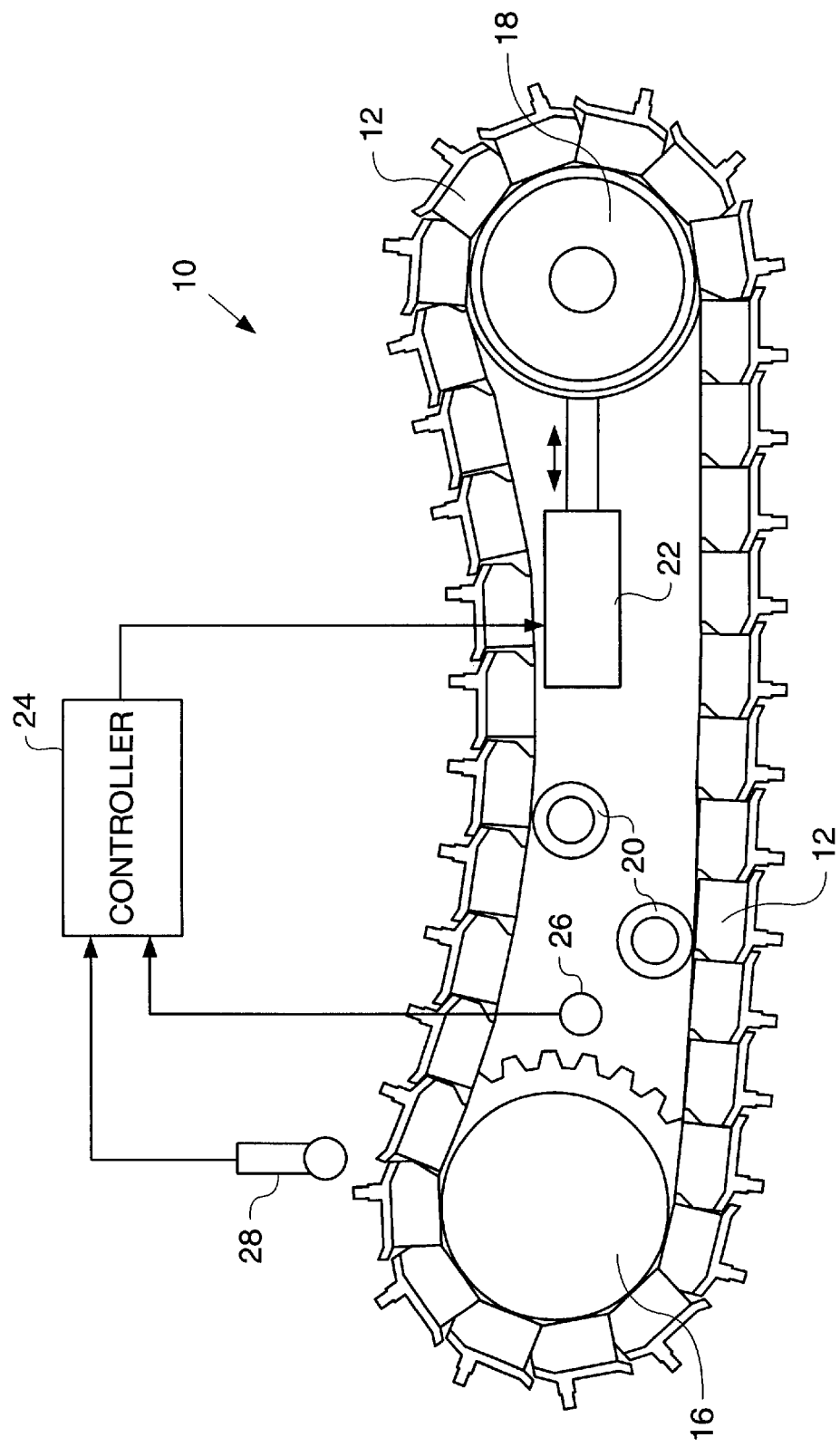

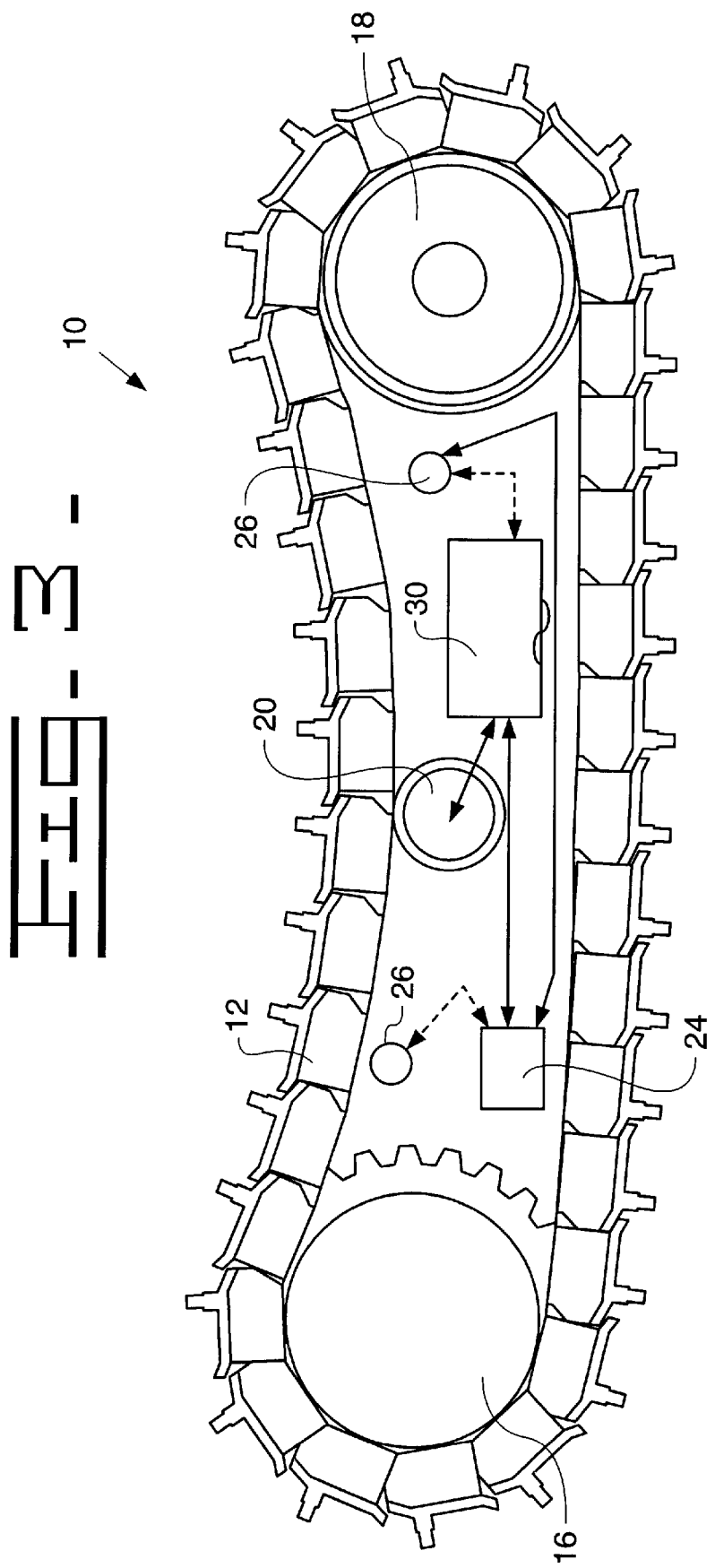

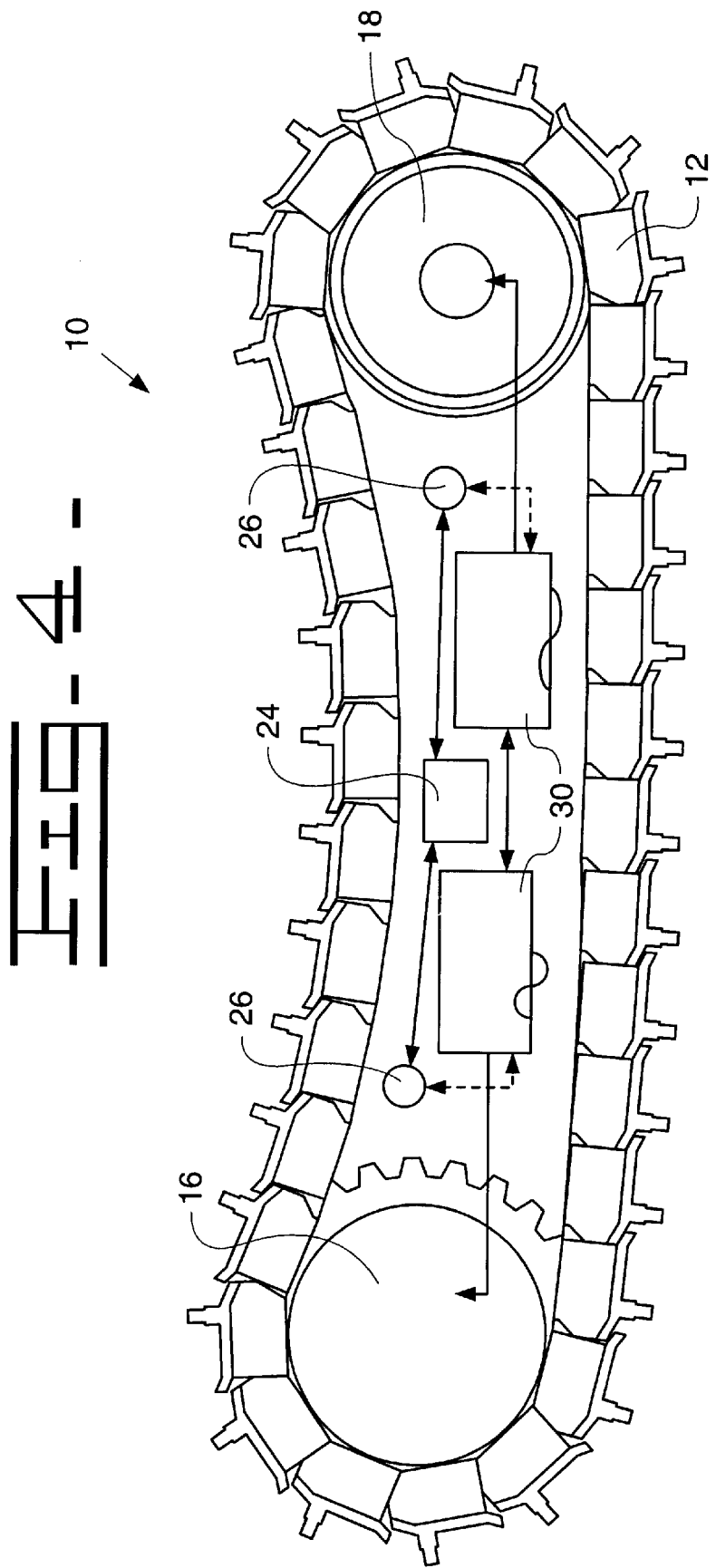

TRACK ADJUSTMENT ASSEMBLY TO REDUCE VIBRATION

This application claims the benefit of prior provisional patent application Serial No. 60/150,263 filed Aug. 23, 1999.

FIELD OF THE INVENTION

This invention relates generally to the adjustment of continuous tracks for mobile machines and, more particularly, a method and apparatus to sense vibrational forces on the continuous tracks and determine parameters and then utilize these parameters to adjust the continuous tracks to reduce the vibrational forces.

BACKGROUND OF THE INVENTION

Continuous interlinking tracks are frequently used on large mobile machines such as earth moving machines. The tracks are typically supported by a number of track wheels on a track frame. The track wheels usually include a drive wheel, idler wheel and a number of carrier wheels. The track must maintain a certain tension relative to the track wheels for the proper operation of the mobile machine. Over time, the track slackens or loosens relative to the track wheels. This slackening reduces the operating efficiency of the machine and produces track noise. Track adjustment devices have been developed to maintain the proper tension of the track relative to the track wheels.

Some examples of track adjustment devices are disclosed in U.S. Pat. Nos. 3,768,878 and 4,514,014. These prior art adjustment devices require manual inspection and adjustment of the tracks. Further, these adjustment devices do not automatically adjust in response to vibrational forces or track noise exerted by the track.

The present invention is directed to overcome one or more of the problems as set forth above.

DISCLOSURE OF THE INVENTION

In one aspect of this invention, a method of adjusting a continuous track of a mobile machine using a controller connected to an adjustment device is disclosed. The method comprises the steps of, sensing vibrational forces of the track, determining the parameters of the vibrational forces, sending the parameters of the vibrational forces to the controller, then sending the parameters of the vibrational forces from the controller to the adjustment device, and adjusting the track automatically to reduce the vibrational forces.

In another aspect of the invention, a track assembly for a mobile machine is disclosed. The track assembly includes a continuous track driven about a track frame. A track wheel is rotatably supported by the track frame and engages the track. An adjustment device is connected to the track wheel. The adjustment device is adapted for adjusting a relative position of the track wheel to tension the track. A controller is connected to the adjustment device to control the adjustment of the track wheel. A sensor is disposed adjacent the track and connected to the controller. The sensor is adapted for sensing vibrational forces of the track and transmitting parameters of the forces to the controller to automatically adjust the track.

BRIEF DESCRIPTION OF THE DRAWINGS

FIG. 1 is a perspective view of a track assembly for a mobile machine incorporating the aspects of the subject invention;

FIG. 2 is a schematic side view of the track assembly of FIG. 1;

FIG. 3 is an alternative embodiment of the track assembly; and

FIG. 4 is another alternative embodiment of the track assembly.

BEST MODE FOR CARRYING OUT THE INVENTION

Referring to FIGS. 1 and 2, a track assembly for a mobile machine is shown. The mobile machine may be any suitable crawler type vehicle, earthmoving machine or the like, such as motor graders and bulldozers. The track assembly 10 comprises a continuous track 12 driven about a track frame 14. The track frame 14 may be of any suitable design for supporting the track 12. The track 12 is preferably an endless chain of links interconnecting a plurality of track shoes.

The components, shown in FIG. 1, comprise one of two track assemblies 10 normally utilized on such mobile machines. As appreciated, a mirror image of the track assembly 10 shown exists on the opposite side of the vehicle. For illustrative purposes, only one side is shown and discussed in greater detail below.

A track wheel 16, 18, 20 is rotatably supported by the track frame 14 and engages the track 12. The track assembly 10 includes a number of track wheels 16, 18, 20. Two of the main track wheels 16, 18, 20 are a drive wheel 16 and an idler wheel 18. The drive wheel 16 has a number of teeth for driving the track 12 and the idler wheel 18 spins freely with the track 12 as is known in the art. There are also a number of carrier wheels 20 disposed along the track 12 for supporting the track 12 between the drive 16 and idler 18 wheels. This type of track 12 and wheel 16, 18, 20 arrangement is well known in the mobile machine art.

An adjustment device 22 is connected to one of the track wheels 16, 18, 20. The adjustment device 22 is adapted for adjusting a relative position of the track wheel 16, 18, 20 to tension the track 12. Preferably, the adjustment device 22 is connected to the idler wheel 18 for incrementally adjusting the idler wheel 18. As discussed in the background section, the tensioning of the track 12 reduces track noise and maintains proper operating parameters.

The adjustment device 22 is shown as a mechanical adjustment device 22 in FIG. 1 and schematically as a hydraulic recoil cylinder 22 in FIG. 2. The adjustment device 22 may adjust the stiffness and/or dampening of the track wheels 16, 18, 20. As appreciated and as discussed below with reference to the alternative embodiments, the adjustment device 22 may be connected to any of the track wheels 16, 18, 20 and may be of any suitable design.

A controller 24 is connected to the adjustment device 22 to control the adjustment of the track wheel 16, 18, 20. The controller 24 may be any suitable type of computer or processor as is known in the art.

A sensor 26, 28 is disposed adjacent the track 12 and is connected to the controller 24. The sensor 26, 28 is adapted for sensing vibrational forces of the track 12 and transmitting parameters of the forces to the controller 24 to automatically adjust the track 12. The vibrational forces, which create track noise, are in direct correlation to track tension. In other words, the larger the vibrational forces, or track noise, the looser the track 12 has become. Accordingly, the sensor 26, 28 of the subject invention senses the track noise for determining the appropriate adjustment for reducing the track tension.

As shown schematically in FIG. 2, the sensor 26, 28 is preferably a vibration sensor 26 for determining the vibrational forces (track noise) of the machine parts. These parts include the track 12, track wheels 16, 18, 20, track frame 14 and any other related component. Even more preferably, the vibration sensor 26 is an accelerometer. As also shown in FIG. 2, the sensor 26, 28 may also be a microphone 28 for sensing the vibrational forces (track noise) of the air.

The method of adjusting the continuous track 12 is now discussed in detail. The method comprises the steps of sensing the vibrational forces of the track 12 with the sensor 26, 28. The parameters of the vibrational forces are then determined. The parameters of the vibrational forces are sent to the controller 24. The controller 24 determines if an adjustment of one of the track wheels 16, 18, 20 is necessary. In other words, the controller 24 determines if the vibrational forces are of such a magnitude that an adjustment of the track wheel 16, 18, 20 will be able to dampen the vibration. The controller 24 also determines the amount of adjustment. As discussed above, the track wheel 16, 18, 20 in the preferred embodiment is the idler wheel 18. As also appreciated, there may be multiple adjustments of more than one track wheel 16, 18, 20.

If an adjustment is necessary, the parameters of the vibrational forces are sent from the controller 24 to the adjustment device 22. The track 12 is then automatically adjusted to reduce the vibrational forces.

Referring to FIG. 3, an alternative embodiment of the track assembly 10 is shown. The track assembly 10 includes a pair of vibration sensors 26 interconnected to a controller 24. The principle difference between this alternative embodiment and the primary embodiment is in the adjustment device 30. The adjustment device 30 of this alternative embodiment is connected to one of the carrier wheels 20. Hence, the track wheel 16, 18, 20 of this embodiment is the carrier wheel 20.

The adjustment device 30 in FIG. 3 is a motion inputting mechanism 30 for variably moving the carrier wheel 20 in response to the vibrational forces. As appreciated, the motion inputting mechanism 30 is shown schematically. The vibrational forces, or track noise, also depends on the track dynamics. The track dynamics affect the impact of the track 12 with the drive 16 and idler 18 wheels.

The motion inputting mechanism 30 is a device, which inputs a certain amount of vibration in order to counter-act and/or add to the vibrational forces currently in the track 12. The motion inputting mechanism 30 inputs a random quickly moving force or motion to modify the track dynamics and reduce catenary action of the track 12. This in turn reduces the vibrational forces and track noise. This also ensures that the vibration within the track 12 remains at a predetermined operating level. The motion inputting mechanism 30 may be a variable spring or any other suitable device. As appreciated, the actual movement of the carrier is relatively small, typically a few millimeters. As appreciated by those skilled in the art, the amount of movement is not as important as the dynamics of the movement.

Referring to FIG. 4, another alternative embodiment of track assembly 10 is shown. This embodiment includes two motion inputting mechanisms 30. One of the motion inputting mechanisms 30 is connected to the drive wheel 16 and one is connected to the idler wheel 18 for variably moving the drive 16 and idler 18 wheels in response to the vibrational forces. The adjustment of the drive 16 and idler 18 wheels may be done independently or in conjunction with each other.

Of course, various modifications of this invention would come within the scope of the invention. The main fundamental concept is to provide an adjustment device 22, 30 for a continuous track 12 which reduces track noise and automatically tensions the track 12.

INDUSTRIAL APPLICABILITY

The present invention is applicable in automatically controlling the track noise and track tension of a continuous track 12 in a mobile or earthmoving machine.

The following description is only for the purposes of illustration and is not intended to limit the present invention as such. It will be recognizable, by those skilled in the art, that the present invention is suitable for a plurality of other applications.

The present invention includes but is not limited to a method and assembly for adjusting a continuous track of a mobile machine using a controller connected to an adjustment device, including sensing vibrational forces of the track, determining the parameters of the vibrational forces, sending the parameters of the vibrational forces to the controller, sending the parameters of the vibrational forces from the controller to the adjustment device, and adjusting the track automatically to reduce the vibrational forces.

In view of the foregoing, it is readily apparent that the subject continuous track adjustment assembly and method provides a reduction of vibrational forces in a very simple and effective manner that results in a reduction of the catenary action of the continuous track and thereby reduces noise.

Other aspects, objects and advantages of this invention can be obtained from a study of the drawings, the disclosure and the appended claims.

What is claimed is:

1. A track assembly for a mobile machine comprising;
   a continuous track driven about a track frame;
   a track wheel rotatably supported by said track frame and engaging said track;
   an adjustment device connected to said track wheel, said adjustment device adapted for adjusting a relative position of said track wheel to tension said track;
   a controller connected to said adjustment device to control said adjustment of said track wheel; and
   a sensor disposed adjacent said track and connected to said controller, said sensor being adapted for sensing vibrational forces of said track and transmitting parameters of said forces to said controller to automatically adjust said track.

2. The assembly as set forth in claim 1, wherein said track wheel is an idler wheel engaging said track.

3. The assembly as set forth in claim 2, wherein said adjustment device is connected to said idler wheel.

4. The assembly as set forth in claim 3, wherein said sensor is a vibration sensor for determining said vibrational forces.

5. The assembly as set forth in claim 4, wherein said vibration sensor is an accelerometer.

6. The assembly as set forth in claim 3, wherein said sensor is a microphone.

7. The assembly as set forth in claim 4, wherein said adjustment device is a hydraulic cylinder for incrementally adjusting said idler wheel.

8. The assembly as set forth in claim 3, wherein said adjustment device is a motion inputting mechanism adapted for variably moving said idler wheel in response to said vibrational forces.

9. The assembly as set forth in claim 1, wherein said track wheel is a carrier wheel engaging said track.

10. The assembly as set forth in claim 7, wherein said adjustment device is connected to said carrier wheel.

11. The assembly as set forth in claim 10, wherein said sensor is a vibration sensor for determining said vibrational forces.

12. The assembly as set forth in claim 11, wherein said adjustment device is a motion inputting mechanism for variably moving said carrier wheel in response to said vibrational forces.

13. A method of adjusting a continuous track of a mobile machine using a controller connected to an adjustment device, said method comprising the steps of:

sensing vibrational forces of the track;

determining the parameters of the vibrational forces;

sending the parameters of the vibrational forces to the controller;

sending the parameters of the vibrational forces from the controller to the adjustment device; and adjusting the track automatically to reduce the vibrational forces.

14. The method as set forth in claim 13, wherein the adjusting of the track is further defined by providing a track wheel engaging the track and connected to the adjustment device such that movement of the track wheel adjusts the track.

* * * * *